(12) United States Patent
Nastasi et al.

(10) Patent No.: US 7,906,874 B2
(45) Date of Patent: Mar. 15, 2011

(54) METHOD AND CIRCUIT FOR MANAGING START-UP PHASE OF AT LEAST A MICRO FUEL CELL TO BE CONNECTED TO A LOAD

(75) Inventors: Giuseppe Nastasi, Tremestieri Etneo (IT); Salvatore Abbisso, Augusta (IT); Vincenzo Ortisi, Augusta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 910 days.

(21) Appl. No.: 11/697,153

(22) Filed: Apr. 5, 2007

(65) Prior Publication Data

US 2007/0237992 A1 Oct. 11, 2007

(30) Foreign Application Priority Data

Apr. 6, 2006 (EP) .................................. 06425242

(51) Int. Cl.
*H01H 31/00* (2006.01)
(52) U.S. Cl. ..................................................... 307/115
(58) Field of Classification Search .................... 307/115
See application file for complete search history.

(56) References Cited

U.S. PATENT DOCUMENTS

2003/0022031 A1 1/2003 Manery
2003/0207162 A1 11/2003 Reiser

FOREIGN PATENT DOCUMENTS

| EP | 1233468 A2 | 8/2002 |
|----|------------|--------|
| EP | 1471588 A1 | 10/2004 |
| EP | 1638159 A2 | 3/2006 |
| JP | 01154469 | 6/1989 |

*Primary Examiner* — Robert L. Deberadinis
(74) *Attorney, Agent, or Firm* — Lisa K. Jorgenson; Robert Iannucci; Seed IP Law Group PLLC

(57) ABSTRACT

A managing method of the start-up phase of at least one micro fuel cell to be connected to a load includes: measuring a micro fuel cell voltage value across the micro fuel cell activated by means of a fuel injection; comparing the micro fuel cell voltage value with a first threshold voltage value; and establishing an operation mode of the micro fuel cell as follows: as long as the micro fuel cell voltage value is lower than the first threshold voltage value, the micro fuel cell operates in a first open circuit state, during which it is not connected to the load; when the micro fuel cell voltage value overcomes the first threshold voltage value, the micro fuel cell passes to a second pre-ignition state, during which it supplies a current value corresponding to the first threshold voltage value, according to a static voltage-current characteristic of the micro fuel cell.

30 Claims, 12 Drawing Sheets

METHOD AND CIRCUIT FOR MANAGING START-UP PHASE OF AT LEAST A MICRO FUEL CELL TO BE CONNECTED TO A LOAD

BACKGROUND OF THE INVENTION

1. Field of the Invention

The present invention relates to a managing method of the start-up phase of at least one micro fuel cell to be connected to a load.

More specifically the invention relates to a method of the above type comprising the steps of:

measuring a micro fuel cell voltage value across said at least one micro fuel cell activated by means of fuel injection.

The invention also relates to a managing circuit of the start-up phase of at least one micro fuel cell to be connected to a load.

The invention particularly, but not exclusively, relates to a method and circuit for managing the start-up phase of a stack of micro fuel cells and the following description is made with reference to this field of application by way of illustration only.

2. Description of the Related Art

As it is well known, a fuel cell substantially is an energy electrochemical converter which transforms the chemical energy of a fuel directly into DC electricity.

The operation mechanism of a fuel cell is based on a chemical reaction, wherein the elements at stake are a fuel and a comburent. The fuel can be hydrogen, methanol or other, while the comburent is oxygen. From this chemical reaction electricity, heat and water originate, as schematically shown in FIG. 1.

In particular, in this figure a fuel cell 1 is schematized which is supplied with hydrogen ($H_2$) and oxygen ($O_2$) and which produces electric energy (in particular electrons $e^-$), water ($H_2O$) and heat (cal).

The energetic profile of a generic chemical reaction can be represented by the following diagram:

$$A+B \rightarrow C+D \qquad (1)$$

In general, in order for two substances (A+B) to react and give reaction products (C+D) it is necessary that these reactants impact against each other. Not all the impacts between reactants are reactive, but to the purposes of the obtainment of the products and from an energetic point of view only those occurring between molecules having a higher or equal energy with respect to an activation energy Ea are useful. The activation speed of a reaction is thus linked to the number of molecules having a higher or equal energy E with respect to the activation energy Ea (E≧Ea), as schematically shown in FIG. 2, where the energy E is indicated as a function of the reaction state, as well as a portion of energy Er released by the reaction itself. If the probability of having molecules with enough energy is low, then the reaction will proceed slowly, vice versa if the number of molecules is high.

It is possible to act on the activation speed by increasing the temperature of the reactants or by lowering the activation energy Ea by using catalysts, as it usually occurs in the use of fuel cell.

Notwithstanding the adoption of these measures, the attainment of the complete functionality of the fuel cells, is not, however, instantaneous; in particular, when a fuel cell is supplied with a fuel, the production of electricity is not immediate, but it effectively starts after a certain delay commonly indicated as "start-up" time.

In general, "start-up" indicates the time interval lapsing between the introduction of the fuel into a fuel cell and the stabilization of its static characteristic I-V.

The use is also widespread of micro fuel cells as portable supply sources for low power electronic devices. A central membrane coated on both sides by a catalyst layer is the core of a micro fuel cell; across the membrane the reaction occurs with the fuel on one side and with the oxygen present in the air on the other side and they can be realized with techniques known in the field of the microelectronics with extremely reduced dimensions.

In this case, among the factors influencing the start-up time there are also the moisturizing of the membrane, the diffusion time of the gases through a so called "gas diffusion layer", and others more.

Micro fuel cells are normally organized in stack structures, where the cells are substantially overlapped on one another.

Considering the case of a stack of three micro fuel cells supplied with hydrogen, the progress of the open circuit voltage obtained across it during the start-up phase has a typical profile of the type shown in FIG. 3A, the stack of micro fuel cells reaching the steady state after a period equal to about 40 s.

Moreover, it is known that a stack of micro fuel cells shows a I-V (current-voltage) characteristic which is static—i.e., relative to all the possible working points of the stack—and stabilized—i.e., once the full operation condition has been reached—of the type shown in FIG. 3B. In particular, three operation areas are distinguished: an activation biasing region (A1), an ohmic region (A2), and a concentration biasing region (A3).

It is thus easily understood that, if a load is connected to a stack of micro fuel cells before the end of the start-up time, the time necessary for the micro fuel cells to reach their optimal operation condition increases and, at least initially, the stack cannot operate at the maximum of its potentiality.

In other words, the connection of a load to a stack of micro fuel cells before the start-up phase has been completed causes, as a matter-of-fact, the operation of the stack below its potentiality. The delicacy and the importance that this step holds are thus evident so as to operate with a perfectly stabilized stack of micro fuel cells.

To overcome this drawback, the solutions of the prior art being currently used in the field provide the use of power generators with functions of backup or emergency elements. In particular, systems for supplying micro fuel cells are known comprising at least one pre-charged buffer battery able to supply a load connected to the micro fuel cell, or the stack of micro fuel cells, during the start-up period, with enough power to allow a connection also in this initial operation phase of the micro fuel cells.

These supply systems comprising a buffer battery thus provide a connection of this latter to the load up to the completion of the stack start-up phase. The buffer battery supplies, in addition, the energy necessary to supply a control circuit supervising the start-up phase so as to connect the load to the stack only once it is stabilized.

Although advantageous under several points of view, these known solutions show several drawbacks. In particular, it is immediately evident that these supply systems are not able to manage a start-up phase of a stack of micro fuel cells in case this buffer battery is down as well.

BRIEF SUMMARY OF THE INVENTION

One embodiment of the present invention is provides a system for managing the power up step of at least one micro fuel cell, having such structural and functional characteristics as to allow to overcome the limits and drawbacks still affecting the systems realized according to the prior art.

One embodiment of the present invention maintains the micro fuel cells in an open circuit state until their activation or start-up phase has been ended by inserting, between at least one micro fuel cell and a load which is driven thereby, a circuit for managing the start-up phase acting as a controlled switch and connecting the micro fuel cell to the load only after this micro fuel cell has ended its start-up phase, indeed.

The characteristics and the advantages of the managing method and circuit of the start-up phase of at least one micro fuel cell will be apparent from the following description of embodiments thereof given by way of indicative and non limiting example with reference to the annexed drawings.

DETAILED DESCRIPTION OF THE INVENTION

With reference to these figures, a circuit is described for managing the start-up phase of at least one micro fuel cell realized according to one embodiment of the invention, globally and schematically indicated with 10.

Figure 4A:
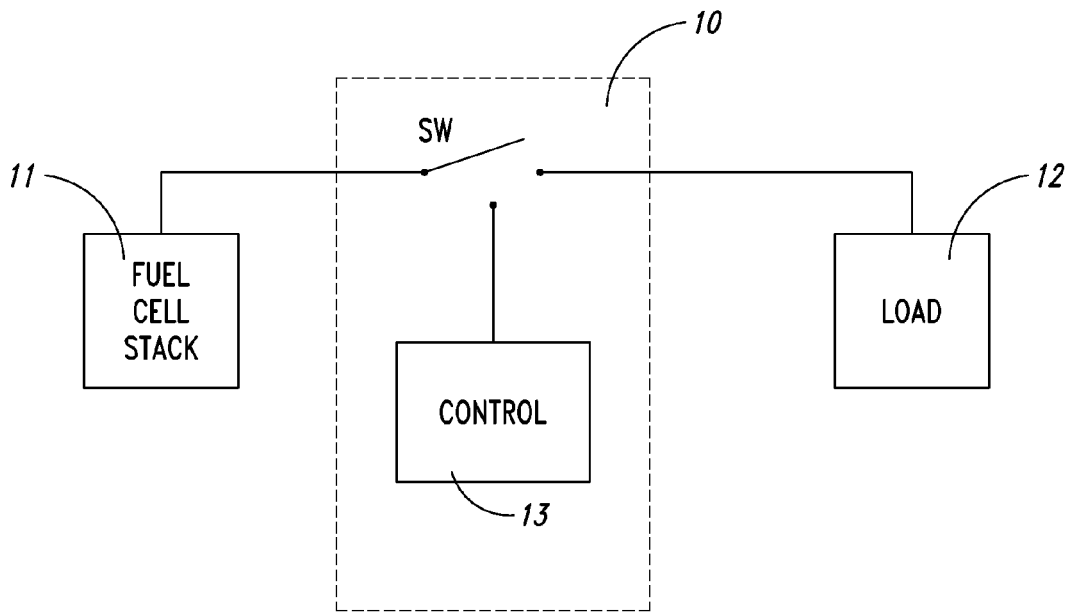
FIGS. 4A and 4B schematically show the operation principle of a managing circuit of the start-up phase of at least one micro fuel cell realized according to the invention.

In particular, as shown in FIG. 4A, the managing circuit 10 is inserted between at least one micro fuel cell, preferably a stack 11 of micro fuel cells, and a load 12 and it comprises a switch SW driven by a control portion 13.

Advantageously, the managing circuit 10 implements a method for managing the start-up phase of at least one micro fuel cell, preferably a stack 11 of micro fuel cells comprising the steps of:

measuring a voltage value across the stack 11 of micro fuel cells, hereafter indicated as stack voltage $V_{FC}$, the stack 11 being activated through fuel injection;

comparing this stack voltage $V_{FC}$ with a first predetermined threshold voltage value, hereafter indicated as ignition or turn-on threshold $V_{TH}$; and stabilizing an operation mode of the stack 11 of micro fuel cells according to the following conditions:

as long as the stack voltage $V_{FC}$ is lower than the ignition threshold $V_{TH}$ ($V_{FC}<V_{TH}$), the stack 11 of micro fuel cells operates in a first "open circuit" state, during which it is not connected to the load 12 (loadless operation);

when the stack voltage $V_{FC}$ overcomes the ignition threshold $V_{TH}$ ($V_{FC}>V_{TH}$), the stack 11 of micro fuel cells passes to a second "pre-ignition" state, during which the stack 11 of micro fuel cells supplies a current value $I_{FC}$ corresponding to the ignition threshold $V_{TH}$, according to a static voltage current or V-I characteristic of the stack 11 of micro fuel cells.

The managing method of the start-up phase according to one embodiment of the invention thus provides the steps of:

measuring a current value $I_{FC}$ as supplied by the stack 11 of micro fuel cells; and modifying the operation of the stack 11 of micro fuel cells according to the following characteristics:

if the stack 11 of micro fuel cells is not able to supply a current required by the load 12, return into the first open circuit state;

if the stack 11 of micro fuel cells succeeds in supplying the current required by the load 12, passage to a third "ignition" state.

The managing method of the start-up phase finally provides a step of return to the first open circuit state when the stack voltage $V_{FC}$ decreases below a second threshold voltage value, hereafter indicated as shut down threshold $V_{TL}$.

Advantageously, when the stack 11 of micro fuel cells is in the first open circuit operation mode, the managing circuit 10 does not allow its connection to the load 12. Once the stack voltage $V_{FC}$ overcomes the ignition threshold $V_{TH}$, the stack 11 of micro fuel cells is requested to supply a value of current $I_{FC}$ corresponding to the ignition threshold $V_{TH}$, according to the static V-I characteristic of the stack 11 of micro fuel cells.

In particular, the ignition threshold $V_{TH}$ is chosen so that it is next to a predetermined loadless voltage of the stack 11 of micro fuel cells corresponding to the end of the start-up phase, i.e., to a stabilized condition of the stack.

At this point, if the stack 11 of micro fuel cells does not succeed in supplying the current $I_{FC}$ required, there is a return to the first open circuit state; vice versa, there is a passage to the third ignition state.

The stack 11 of micro fuel cells remains in this third ignition state until, once the fuel is exhausted, the stack voltage $V_{FC}$ decreases below the shut down threshold $V_{TH}$.

When this occurs, the stack 11 of micro fuel cells returns to the first "open circuit" state.

Figure 4B:
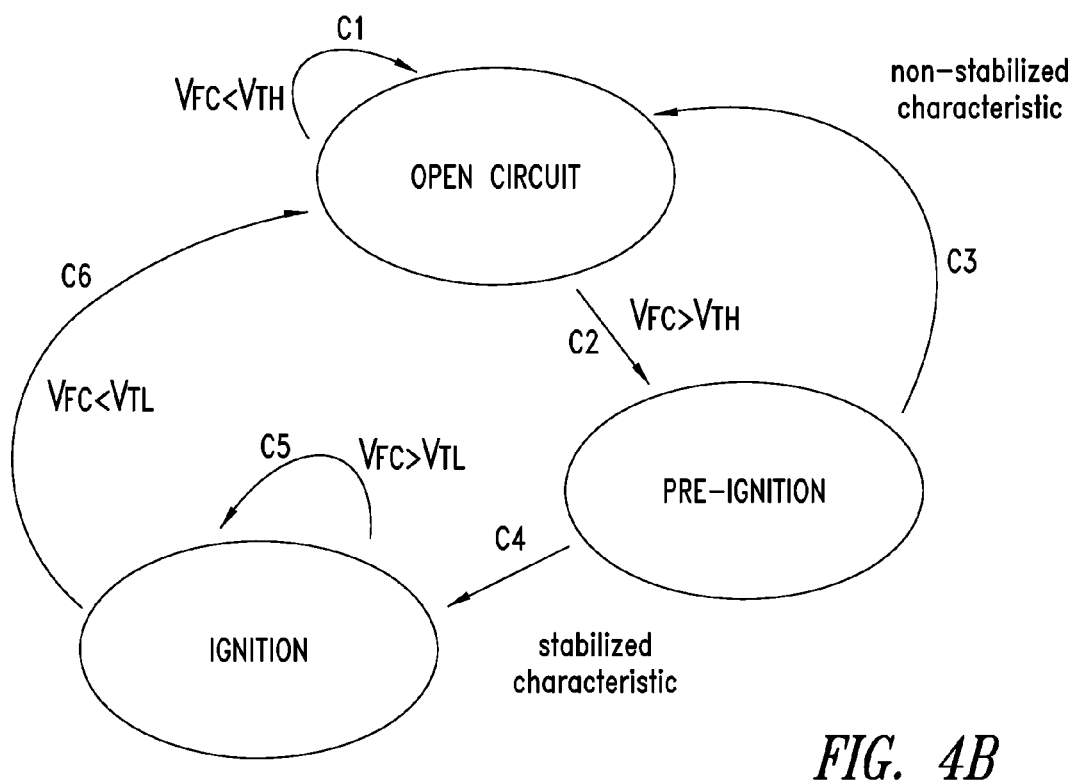

The operation principle of the managing circuit 10 is shown by means of a state diagram in FIG. 4B.

In particular, in this FIG. 4B the first open circuit state, the second pre-ignition state and the third ignition state of a stack 11 of micro fuel cells are shown, respectively indicated with S1, S2 and S3, connected to each other by connections C1, C2, C3, C4, C5 and C6 corresponding to the conditions of the above indicated steps of the method.

In particular, as above explained, the stack 11 of micro fuel cells is maintained in the first open circuit state S1 until the condition $V_{FC}<V_{TH}$ (connection C1) turns out and passes to the second pre-ignition state S2 when the stack voltage $V_{FC}$ overcomes the ignition threshold $V_{TH}$, i.e., the condition $V_{FC}>V_{TH}$ (connection C2) is verified.

At this point, the characteristic of the stack 11 of micro fuel cells is verified by measuring the current $I_{FC}$ supplied and two state passages are possible:
- if the stack 11 of micro fuel cells does not succeed in supplying the current $I_{FC}$ required, i.e., in case of a non-stabilized characteristic, the stack 11 of micro fuel cells returns into the first open circuit state S1 (connection C3);
- if the stack 11 of micro fuel cells succeeds in supplying the current $I_{FC}$ required, i.e., in case of a stabilized characteristic, the stack 11 of micro fuel cells passes to the third ignition state S3 (connection C4).

The stack 11 of micro fuel cells remains in the third ignition state S3 until the condition $V_{FC}>V_{TL}$ (connection C5) is verified and returns into the first open circuit state S1 when the stack voltage $V_{FC}$ decreases below the shut down threshold $V_{TL}$, i.e., the relation $V_{FC}<V_{TL}$ (connection C6) is verified.

Figure 5:
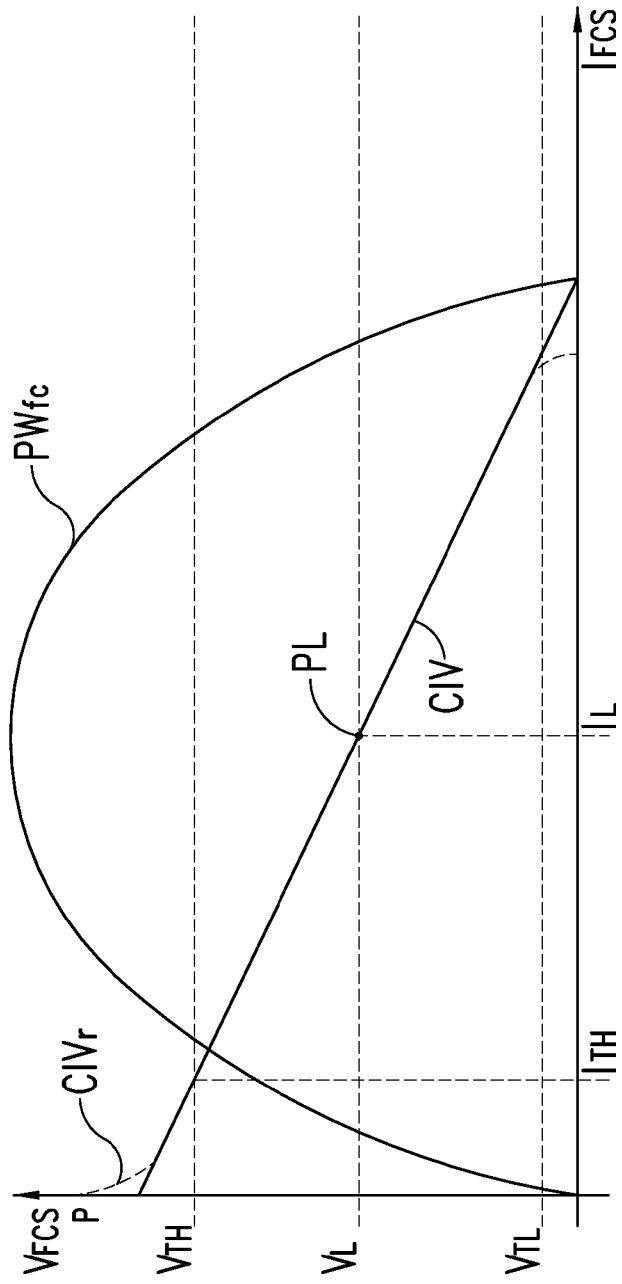
FIG. 5 schematically shows a voltage-current or V-I characteristic of a stack of micro fuel cells under static conditions and the relative power curve.

FIG. 5 shows an approximated stabilized static V-I characteristic typical of a stack of micro fuel cells, globally indicated with CIV, where also the real characteristic (CIVr) and its detachment from an ideal condition in correspondence with the extreme values of this characteristic are indicated with broken lines.

FIG. 5 again indicates the ignition $V_{TH}$ and the shut down $V_{TL}$ threshold values and the corresponding values of supplied current, as well as a pre-selected working point PL in case of staying in the third ignition state S3, to which working current and voltage values, indicated with $V_L$ and $I_L$ respectively, as well as the power curve of such a stack of micro fuel cells, indicated with PWfc, correspond.

Advantageously, the method for managing the start-up phase as just described is implemented by a managing circuit 10 interposed between a stack 11 of micro fuel cells and a load 12, this managing circuit 10 essentially acting as a driven switch. An embodiment of the managing circuit 10 according to one embodiment of the invention is schematically shown in FIG. 6.

In particular, the managing circuit 10 has an input terminal IN connected to a stack 11 of micro fuel cells and an output terminal OUT connected to a load 12 and comprises at least one first enable block 14 inserted between the input terminal IN and the output terminal OUT of the managing circuit 10 and having at least one control terminal connected to an output terminal O* of a generator block 20 comprised in the managing circuit 10. In particular, at the output terminal O* of this generator block 20 a reference voltage signal VREF is generated.

Advantageously, the managing circuit 10 further comprises a second enable block 15 inserted, in series to the first enable block 14, between the input terminal IN and the output terminal OUT of the managing circuit 10 and having at least one control terminal connected to the output terminal O* of the generator block 20.

Figure 6:
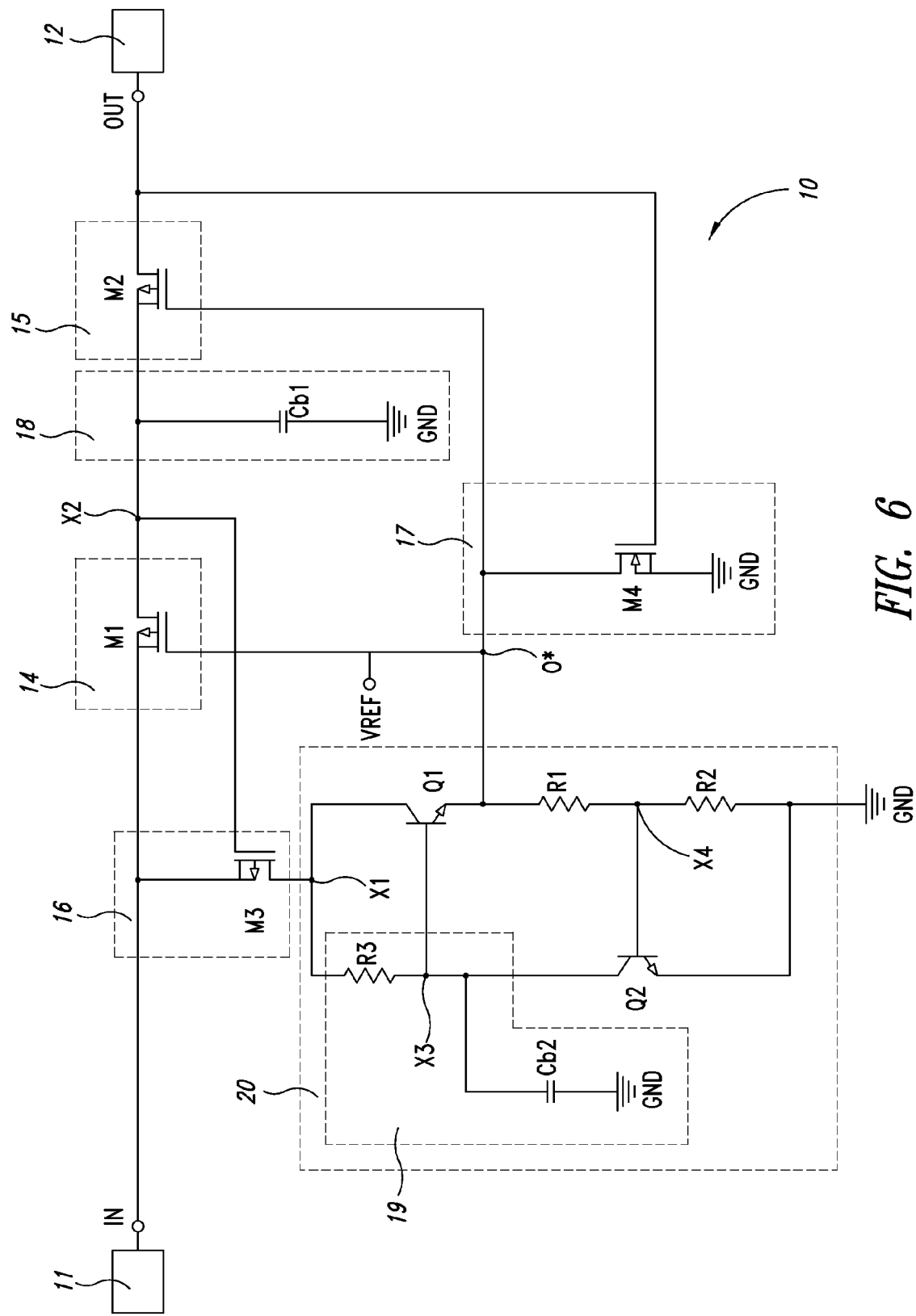
FIG. 6 schematically shows a managing circuit of the start-up phase of at least one micro fuel cell realized according to one embodiment of the invention.

In the example of FIG. 6, these first and second enable block, 14 and 15, comprise a first M1 and a second transistor M2 inserted, in series to each other, between the input terminal IN and the output terminal OUT of the managing circuit 10 and having respective control terminals connected to the output terminal O* of the generator block 20 of an inner voltage reference.

The managing circuit 10 also comprises a first control block 16 inserted between the input terminal IN and a first inner circuit node X1 of interconnection between this first control block 16 and the generator block 20. In particular, in the example shown in FIG. 6, the first control block 16 comprises a first control transistor M3 inserted between the input terminal IN and the first inner circuit node X1 and having a control terminal connected to a second inner circuit node X2 of interconnection between the first 14 and the second biasing block 15.

The managing circuit 10 further comprises a second control block 17, inserted between the output terminal O* of the generator block 20 and a voltage reference, in particular a ground GND. In particular, in the example shown in FIG. 6, the second control block 17 comprises in turn a second control transistor M4 inserted between the output terminal O* of the generator block 20 and the ground GND and having a control terminal connected to the output terminal OUT of the managing circuit 10.

The managing circuit 10 finally comprises a pre-ignition capacitor Cb1, inserted between the second inner circuit node X2 and the ground GND.

In the example shown in FIG. 6, the generator block 20 comprises a first bipolar transistor Q1, as well as a first R1 and a second resistor R2 inserted, in series to each other between the first inner circuit node X1 and the ground GND. The generator block 20 further comprises a third resistor R3 and a second bipolar transistor Q2 also inserted, in series to each other, between the first inner circuit node X1 and the ground GND.

In particular, the first bipolar transistor Q1 is inserted between the first inner circuit node X1 and the output terminal O* of the generator block 20 and has a control terminal connected to a third inner circuit node X3 of interconnection between the third resistor R3 and the second bipolar transistor Q2, in turn inserted between this third inner circuit node X3 and the ground GND and having a control terminal connected to a fourth inner circuit node X4 of interconnection between the first R1 and the second resistor R2.

Finally, the generator block 20 comprises a filtering capacitor Cb2 inserted between the third inner circuit node X3 and the ground GND.

Advantageously according to the invention, the bipolar transistors Q1 and Q2 and the resistors R1, R2 and R3 realize a generator of the reference voltage VREF while the third resistor R3 and the filtering capacitor Cb2 realize a low-pass filter for the noises coming from the stack 11 of micro fuel cells connected to the input terminal IN of the managing circuit 10.

Let's now see the operation of the managing circuit 10 according to one embodiment of the invention.

The first and second transistors, M1 and M2, of the first and second enable blocks, 14 and 15, are substantially switches enabled to the passage from the first open circuit state S1 to the second pre-ignition circuit state S2 and from the second pre-ignition state S2 to the third ignition state S3, while the pre-ignition capacitor Cb1 supervises the second pre-ignition state S2.

In particular, the first transistor M1 of the first enable block 14 is enabled in the passage from the first open circuit state S1 to the second pre-ignition state S2. This first transistor M1 is powered-on in a sub-threshold state and charges the pre-ignition capacitor Cb1 with a sub-threshold current of limited value, drawn from the stack 11 of micro fuel cells. In this way, advantageously according to the invention, the managing circuit 10 absorbs an irrelevant current value with respect to a current potentially supplied by the stack 11 of micro fuel cells and, advantageously according to the invention, does not require an external supply battery.

Moreover, by acting on the value of the pre-ignition capacitor Cb1 one can intervene on the duration of the staying time of the managing circuit 10 in the second pre-ignition state S2.

The ignition of the second transistor M2 of the second enable block 15 brings the voltage value onto the output terminal O* to the ground GND and connects the input terminal IN to the output terminal OUT of the managing circuit 10. This second transistor M2 is enabled in the passage from the second pre-ignition state S2 to the third ignition state S3 and enables the connection of the stack 11 of micro fuel cells to the load 12.

In particular, the sum of the threshold voltage values of these first and second enable transistors, M1 and M2, fix the shut down threshold value $V_{TL}$, used for the shut-down of the managing circuit 10.

It is to be noted that the presence of this ignition threshold $V_{TL}$ allows to maintain the operation level of the stack 11 of micro fuel cells slightly below its maximum performances and can be used for indicating the approaching of the exhausting of the fuel of the stack itself.

To understand the operation of the managing circuit 10 it is to be specified that the first open circuit state S1 comprises two operation sub-steps of the managing circuit 10.

In particular, at the beginning of the start-up phase of the stack 11 of micro fuel cells, the stack voltage $V_{FC}$ applied to the input terminal IN of the managing circuit 10 is null ($V_{FC}=0$). Under these conditions, all the current and voltage values of the managing circuit 10 are null.

As long as the stack voltage $V_{FC}$ remains below a threshold voltage value $V_{TM3}$ of the first control transistor M3 of the first control block 16 ($V_{FC}<V_{TM3}$), the transistors M1, M2, M3 and M4 are off and the generator block 20 which generates the reference voltage signal VREF is disconnected.

When the stack voltage $V_{FC}$ equals or overcomes the threshold voltage value $V_{TM3}$ of the first control transistor M3 of the first control block 16 ($V_{FC} \geq V_{TM3}$), the first control transistor M3 is powered-on and connects the generator block 20 to the input terminal IN of the managing circuit 10 whereat there is the stack voltage $V_{FC}$.

Figure 7A:
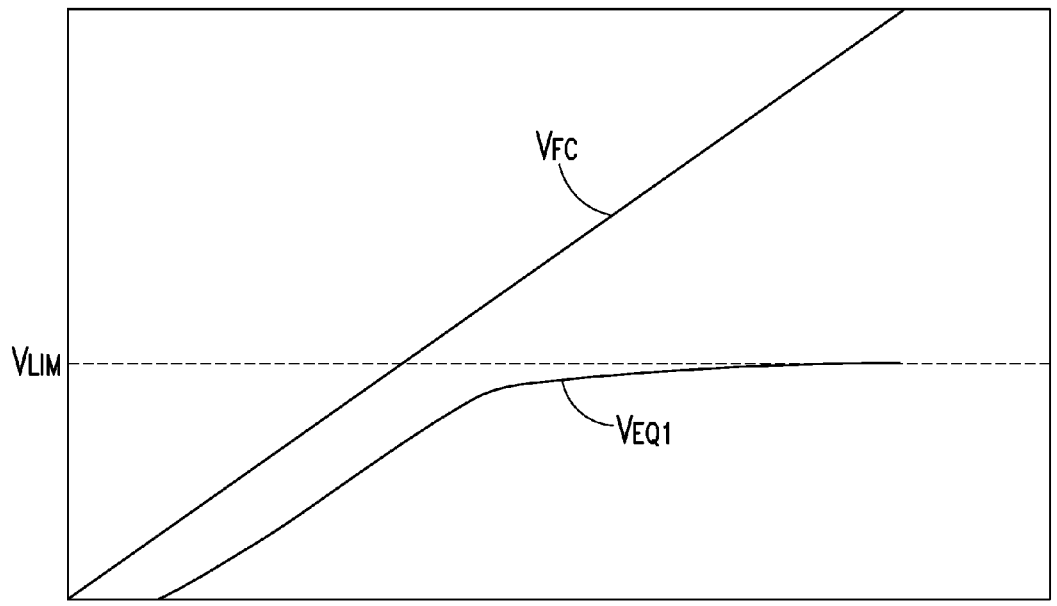
FIGS. 7A and 7B show the progress of inner signals of the managing circuit according to one embodiment of the invention.

By further increasing this stack voltage $V_{FC}$ at the input terminal IN, the voltage value at the output terminal O* of the generator block 20, corresponding to the voltage $V_{EQ1}$ of the emitter terminal of the first bipolar transistor Q1, grows in turn, following the same profile as the stack voltage $V_{FC}$—unless a voltage drop occurs equal to the sum of the voltage between base and emitter of the first bipolar transistor Q1 ($V_{BE1}$) and the voltage between source and drain of the first control transistor M3 ($V_{SDM3}$)—until a limit value $V_{LIM}$ is reached corresponding to a limit value of the reference voltage signal VREF, as shown in FIG. 7A, which reports the progress of the stack voltage $V_{FC}$ and of the voltage $V_{EQ1}$ of the emitter terminal of the first bipolar transistor Q1.

If the stack voltage $V_{FC}$ further grows until it takes a value equal to the ignition threshold $V_{TH}$, given by the sum of the limit value $V_{LIM}$ and of the threshold voltage value $V_{TM1}$ of the first control transistor M1 of the first control block 16 ($V_{FC}=V_{LIM}+V_{TM1}=V_{TH}$), this first control transistor M1 is powered on switching the operation mode of the managing circuit 10 in the second pre-ignition state S2.

In other words, the first open circuit state S1 comprises the following two sub-steps:
$V_{FC}<V_{TM3}$ M1, M2, M3 and M4 are off and the generator block 20 is disconnected; and
$V_{TM3}<V_{FC}<V_{LIM}+V_{TM1}$ M3 is on, the voltage $V_{EQ1}$ at the emitter of Q1 grows following the profile of the input voltage equal to the stack voltage $V_{FC}$ until the limit value $V_{LIM}$ is attained.

In the second pre-ignition state S2, the ignition threshold $V_{TH}$ being fixed at the limits of a voltage value expected for an open circuit operation mode for the stack 11 of micro fuel cells, the first control transistor M1 is in the "sub-threshold" operation region. The current $I_D$ flowing through this transistor is given by:

$$I_D = I_0 \frac{W}{L} e^{\frac{V_{SG}}{V_T}} \left(1 - e^{-\frac{V_{SD}}{V_T}}\right) \qquad (2)$$

wherein:
$V_{SG}$ and $V_{SD}$ are the voltage values between source and gate and between source and drain, respectively, of the transistor M1;
$I_0$ is a technological parameter linked to the realization of the transistor M1; and $$V_T = \frac{KT}{q}$$

is the thermal voltage.
Being $V_{SD}>0$ and $$\frac{V_{SD}}{V_T} > 1$$

the term $$e^{-\frac{V_{SD}}{V_T}}$$

can be neglected. Having also $V_{SG}=V_{FC}-V_{LIM}\approx|V_{T_{M1}}|$ the following is obtained:

$$I_D = I_0 \frac{W}{L} e^{\frac{|V_{T_{M1}}|}{V_T}} \qquad (3)$$

It is thus easily obtained that the second pre-ignition state S2 remains active for a time equal to:

$$t = \frac{(V_{FCS} - |V_{T_{M3}}|) \cdot C_2}{I_0 \frac{W}{L} e^{\frac{|V_{T_{M1}}|}{V_T}}} \qquad (4)$$

Moreover, the passage from the second pre-ignition state S2 to the third ignition state S3 immediately occurs when the following relation is verified:

$$V_{Cb1}=V_{FC}-V_{T_{M3}} \qquad (5)$$

In fact, as soon as the above reported relation (5) turns out, the first control transistor M3 starts to shut down, and the reference voltage signal VREF generated by the generator block 20 decreases allowing a full power-on of the first transistor M1 of the first enable block 14 and thus of the second transistor M2 of the second enable block 15. As soon as a voltage signal $V_{OUT}$ at the output terminal OUT of the managing circuit 10 reaches a threshold voltage value $V_{TM4}$ of the second control transistor M4, this transistor is powered on, bringing the reference voltage signal VREF at the output terminal O* to a value next to zero.

The decrease of the reference voltage signal VREF and the power-on of the second control transistor M4 cause matterly-of-fact a variation of the shut down threshold value of the enable transistors M1 and M2. In fact, in the second pre-ignition state S2 this shut down threshold is equal to the ignition threshold $V_{TH}$, i.e.:

$$V_{TH} = V_{REF} + |V_{T_{M1}}| \quad (6)$$

while, in the third ignition state S3 the shut down threshold $V_{TL}$ is equal to:

$$V_{TL} = \max\{|V_{T_{M1}}|, |V_{T_{M4}}|\} \quad (7)$$

As previously seen, the managing circuit 10 remains in the third ignition state S3 until the exhaust of the fuel of the stack 11 of micro fuel cells causes a decrease of the stack voltage $V_{FC}$ below the shut down threshold $V_{TL}$.

It is also to be specified that, neglecting the voltage variation between base and emitter $V_{BE1}$ of the first bipolar transistor Q1 due to the temperature, a theoretical limit value $V_{LIM}^*$ is obtained for the reference voltage signal VREF equal to:

$$V_{LIM}^* \approx V_{BE2}\left(1 + \frac{R1}{R2}\right) \quad (8)$$

being $V_{BE2}$ the voltage between base and emitter of the second bipolar transistor Q2.

Figure 7B:
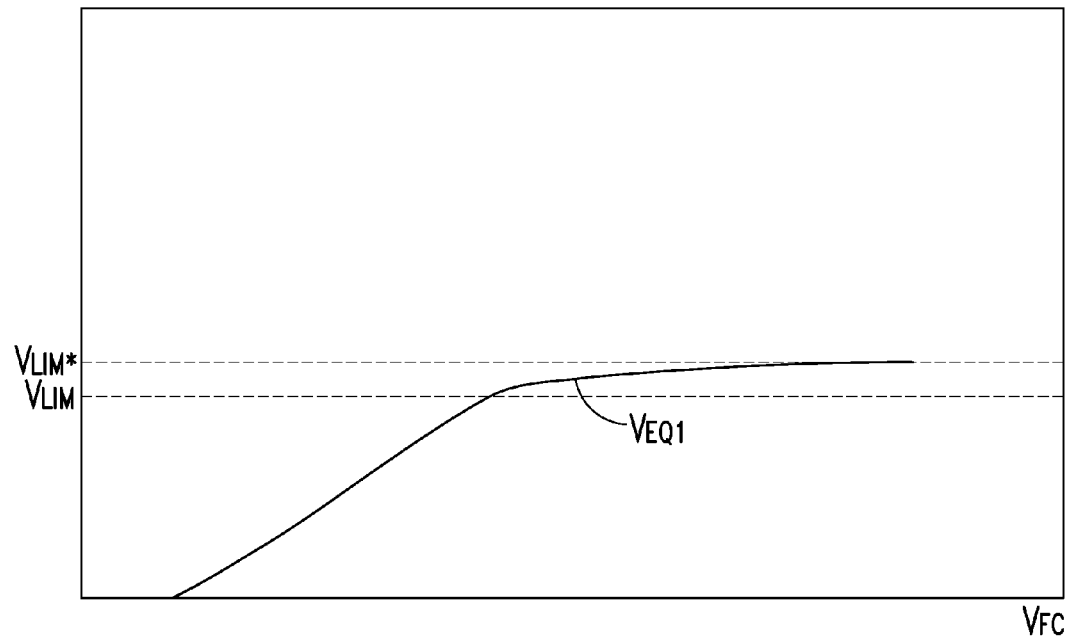

In a practical case, however, the limit value of the reference voltage signal VREF to be considered for the purposes of the activation of the first enable transistor M1 is next to a "knee", as shown in FIG. 7B. The above reported equation (8) is thus to be modified with the introduction of a suitable correction factor (equal to 0.85), obtaining:

$$V_{LIM} \approx 0.85 \cdot V_{BE2}\left(1 + \frac{R1}{R2}\right) \quad (9)$$

Advantageously, the values of the resistors R1, R2 and R3 comprised in the generator block 20 are dimensioned taking into account the currents absorbed by the managing circuit 10. In particular considering:

$$I = I_3 + I_{1-2} \quad (10)$$

I being the current absorbed by the generator block 20, $I_3$ the current in the first resistor R1 and $I_{1-2}$ the current flowing through the series of the first R1 and of the second resistor R2; neglecting the source-drain voltage $V_{SDM3}$ of the first control transistor M3 and the base current of the bipolar transistors Q1 and Q2, what follows is obtained:

$$R2 = \frac{V_{BE2}}{I_{1-2}} \quad (11)$$

$$R3 = \frac{V_{FC_{max}} - (V_{LIM} + V_{BE1})}{I_3} \quad (12)$$

$$R1 = R2\left(\frac{V_{LIM}}{V_{BE1}} - 1\right) \quad (13)$$

Moreover, considering that the third resistor R3 and the filtering capacitor Cb2 realize a low-pass filter 19 of the noises of the stack voltage $V_{FC}$ in the first open circuit state S1 and in the second pre-ignition state S2 having a cut-off frequency $f_T$, the value of the filtering capacitor Cb2 is advantageously determined with the following relation:

$$Cb2 = \frac{1}{2\pi R3 f_T} \quad (14)$$

Finally, the value of the pre-ignition capacitor Cb1 is established on the basis of the dynamics of the stack 11 of micro fuel cells as considered and of the duration which is to be obtained for the staying of the managing circuit 10 in the second pre-ignition state S2.

It is further possible to determine the form ratios of the enable transistors M1 and M2 according to the desired values of ignition resistances $R_{DSON}$; taking into account that in the ignition state these transistors are in triode region the following is obtained:

$$R_{DS_{ON}} = \frac{1}{\mu_P C_{OX} \frac{W}{L}(V_{SG} - |V_{T_{PMOS}}|)} \quad (15)$$

Figure 8A:
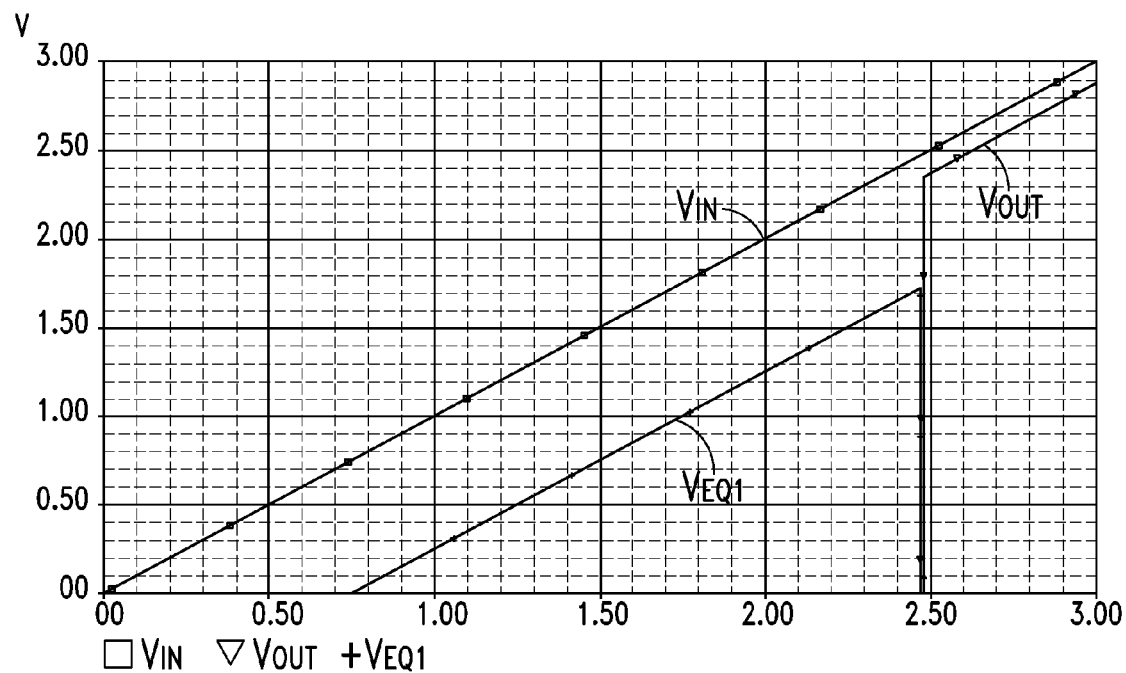
FIGS. 8A-8C show the progress of inner signals of the managing circuit according to one embodiment of the invention under different operative conditions of the same.
Figure 8B:
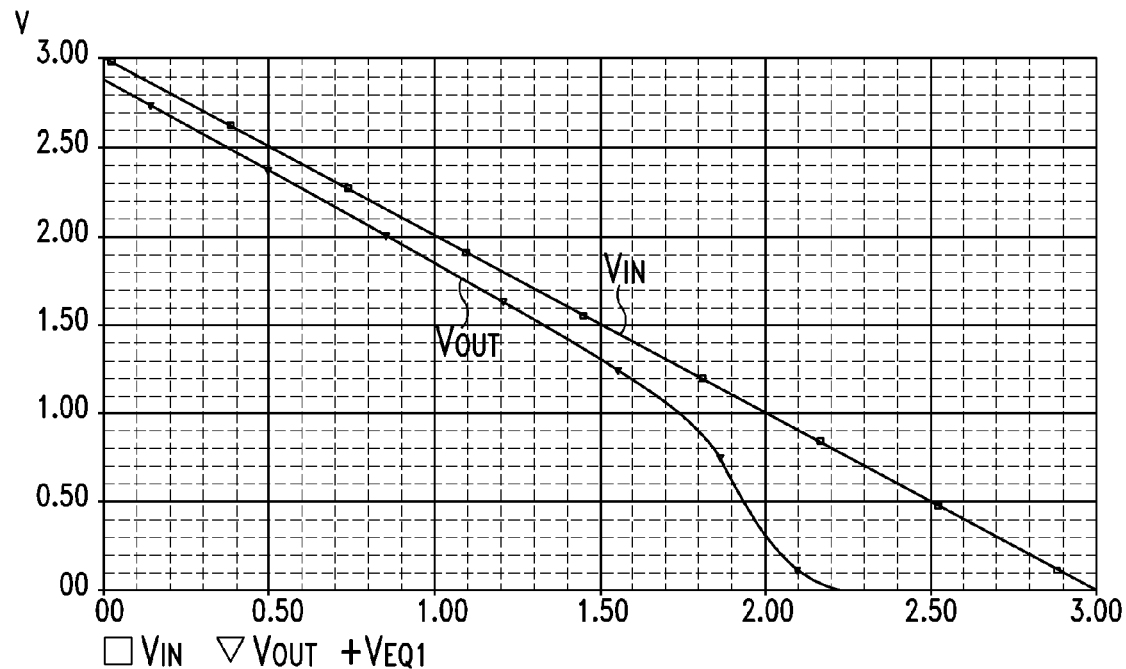
Figure 8C:
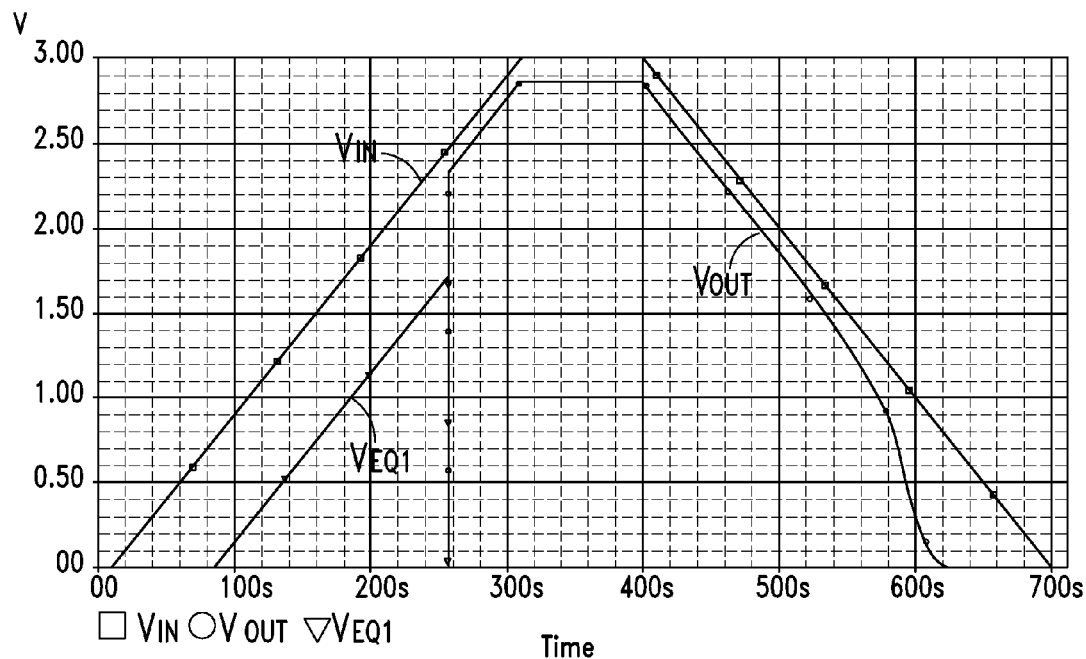

The managing circuit 10 proposed has been simulated by the Applicant, the results of this simulation being shown in FIGS. 8A-8C under the following conditions:
  the values of the resistors R1, R2 and R3 have been chosen so that a limit value $V_{LIM}=1.7V$ was fixed;
  the values of the capacitors have been set equal to CB1=47 uF and Cb2=10 pF; and
  the MOS transistors have been realized with minimum channel length equal to 1.2 um and with threshold voltages given by:

$$V_{TP} = -0.751V \quad (16)$$

$$V_{TN} = 0.736V \quad (17)$$

$V_{TP}$ and $V_{TN}$ being the threshold voltage values of the MOS transistors with P and N channel, respectively Thus, by using the above reported equations (6) and (7), ignition threshold $V_{TH}$ and shut down threshold $V_{TL}$ values are obtained equal to:

$$V_{TH} = 2.45V \quad (18)$$

$$V_{TL} = 0.751V \quad (19)$$

FIG. 8A shows the results obtained by varying the stack voltage $V_{FC}$, corresponding to an input voltage value $V_{IN}$ of the managing circuit 10 in a linear way from 0V up to 3V. In particular the progress is indicated of the signal $V_{OUT}$ at the output terminal OUT of the managing circuit 10 and the progress of the voltage $V_{EQ1}$ at the emitter of the first bipolar transistor Q1 until the limit voltage value VLIM is obtained.

FIG. 8B shows the results of an analysis in DC of the managing circuit 10 obtained by varying the input voltage $V_{IN}$ in a linear way from 3V up to 0V. Also in this case, in particular, the progress is indicated of the signal $V_{OUT}$ on the output terminal OUT of the managing circuit 10 and the progress of the voltage $V_{EQ1}$ on the emitter of the first bipolar transistor Q1.

Similarly, FIG. 8C shows the response of the managing circuit 10 when, to its input terminal IN, a voltage signal $V_{IN}$ is applied which varies in time with a trapezoidal profile. In particular, the input voltage $V_{IN}$ takes 300 s in the passage from 0V up to 3V, and, symmetrically, in the passage from 3V up to 0V. In this FIG. 8C the progresses are shown of the input signal $V_{IN}$, of the output signal $V_{OUT}$ and of the voltage $V_{EQ1}$ at the emitter of the first bipolar transistor Q1.

Figure 9A:
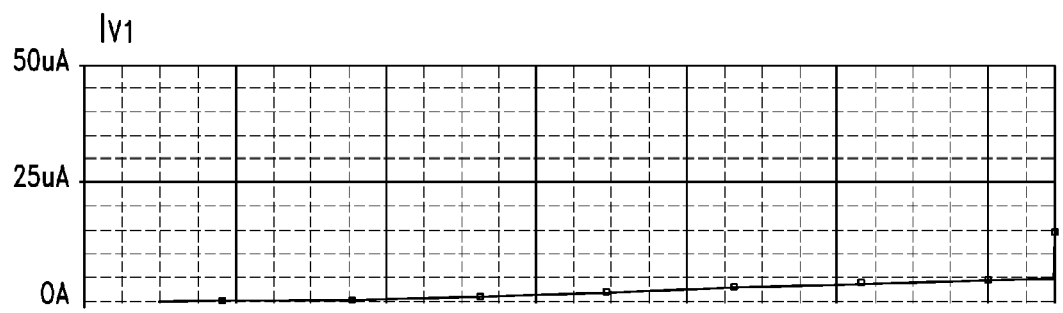
FIGS. 9A and 9B show values of the current absorbed by the managing circuit according to one embodiment of the invention under different operative conditions of the same.
Figure 9B:
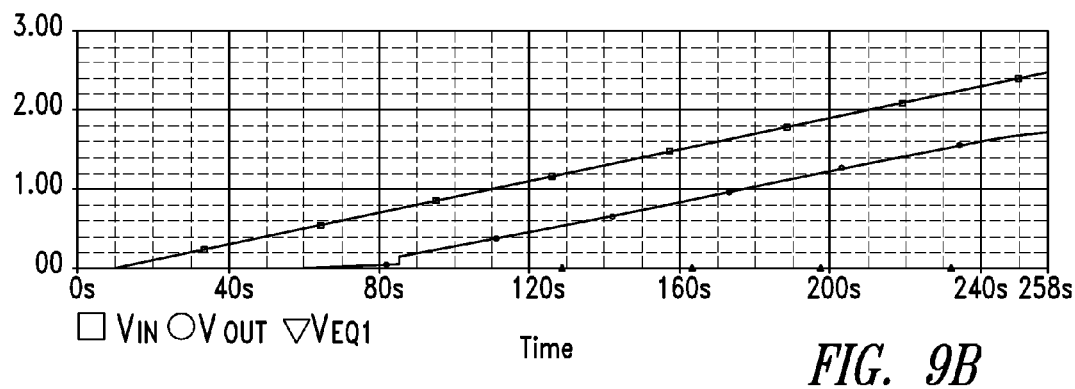

The current absorbed by the managing circuit 10 as a function of the input voltage $V_{IN}$ has also been evaluated, in particular in the first open circuit state S1 and in the second pre-ignition state S2, as shown in FIGS. 9A and 9B respectively.

It has thus been verified that the maximum value of absorbed current is equal to about 5 uA.

Figure 1:
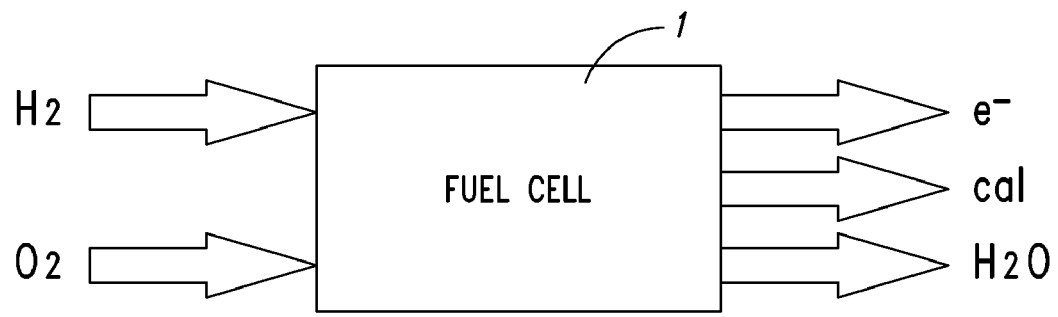
FIG. 1 shows a functional scheme of a fuel cell supplied with hydrogen according to the prior art.
Figure 2:
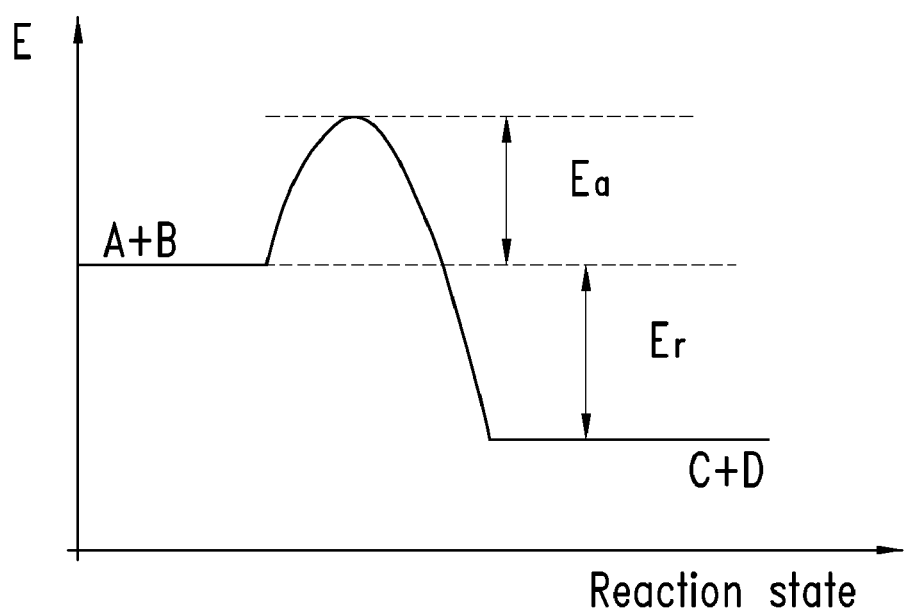
FIG. 2 shows an energetic diagram of a generic exothermic chemical reaction.
Figure 3A:
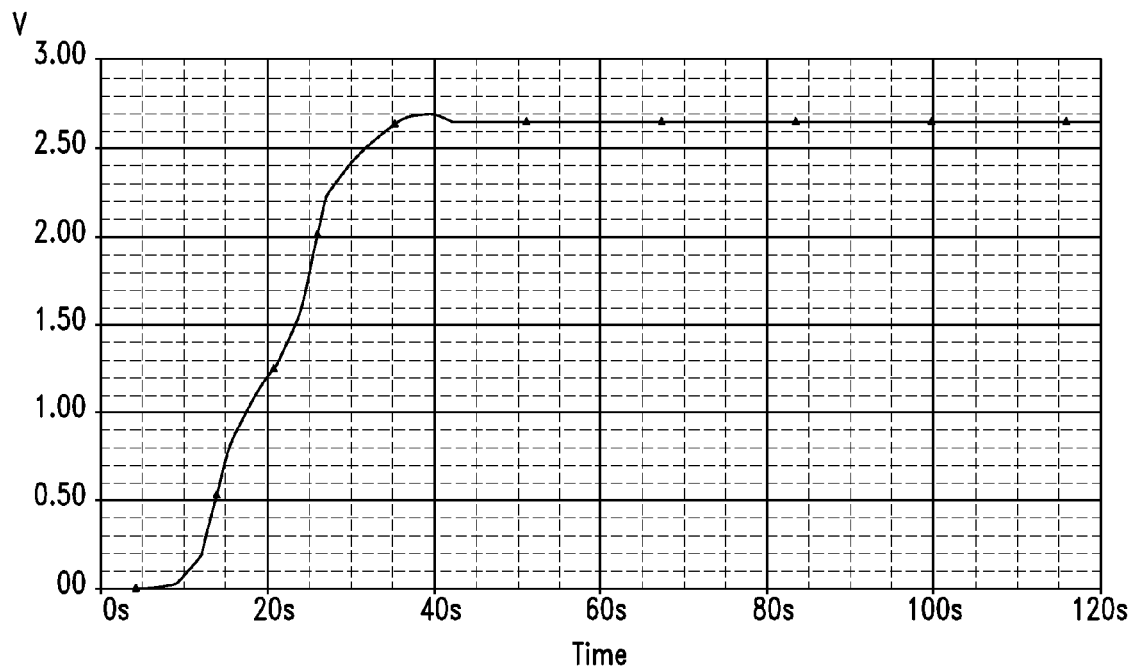
FIGS. 3A to 3B show the progress of inner signals relative to a stack of micro fuel cells realized according to the prior art.
Figure 3B:
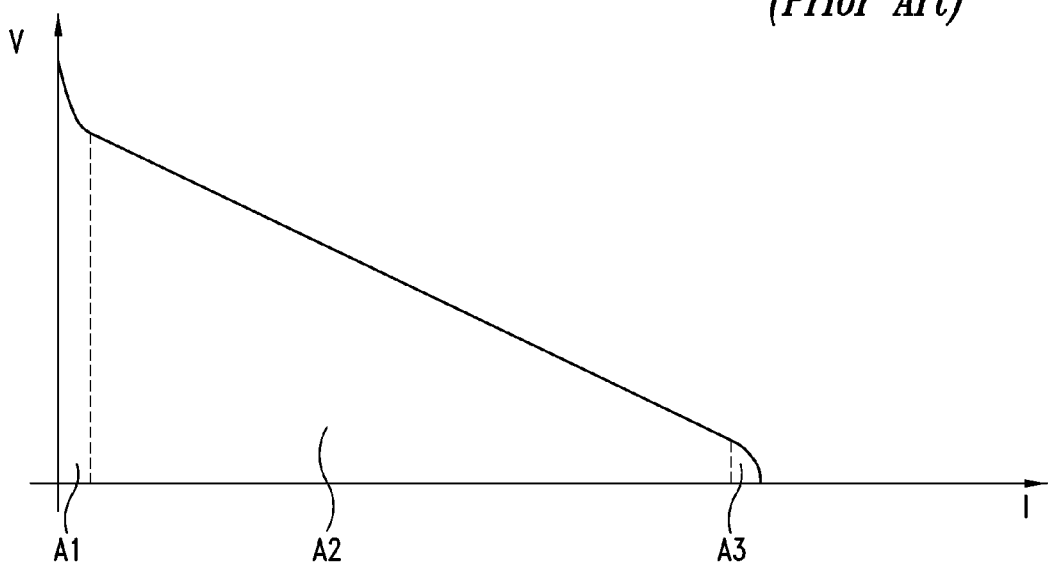
Figure 10:
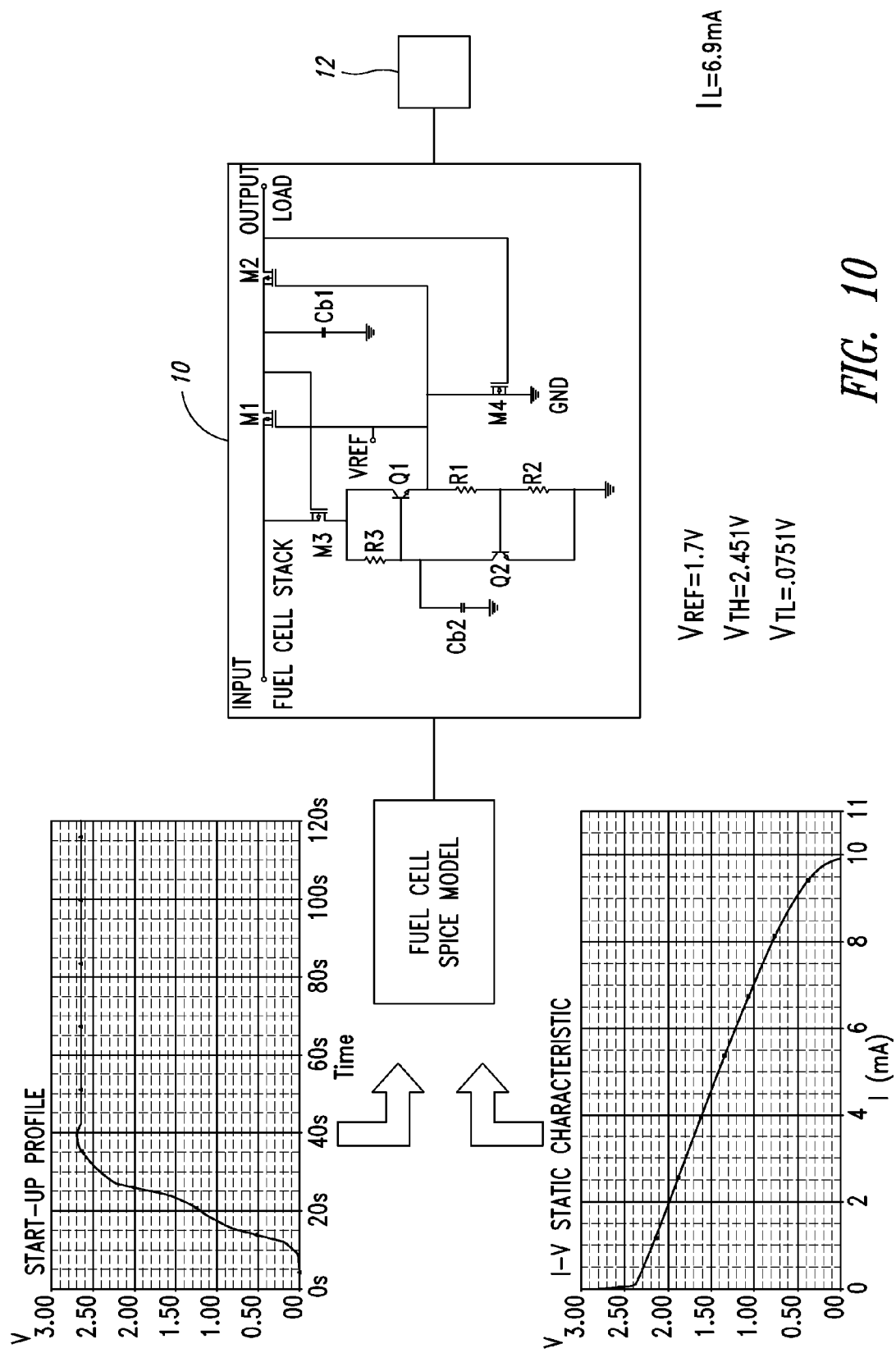
FIG. 10 shows a configuration set-up used to simulate the operation of the managing circuit according to one embodiment of the invention.

The Applicant has then simulated the responses of the managing circuit 10 when the static I-V characteristic of the stack 11 of micro fuel cells connected thereto varies, by applying, at the input, a typical start-up profile as the one shown in FIG. 3A. The simulations have been carried out by connecting, at the input of the managing circuit 10 proposed, a spice model of a stack 11 of micro fuel cells and, at the output, a load 12 of the resistive type of 233Ω, as schematically indicated in FIG. 10.

Figure 11A:
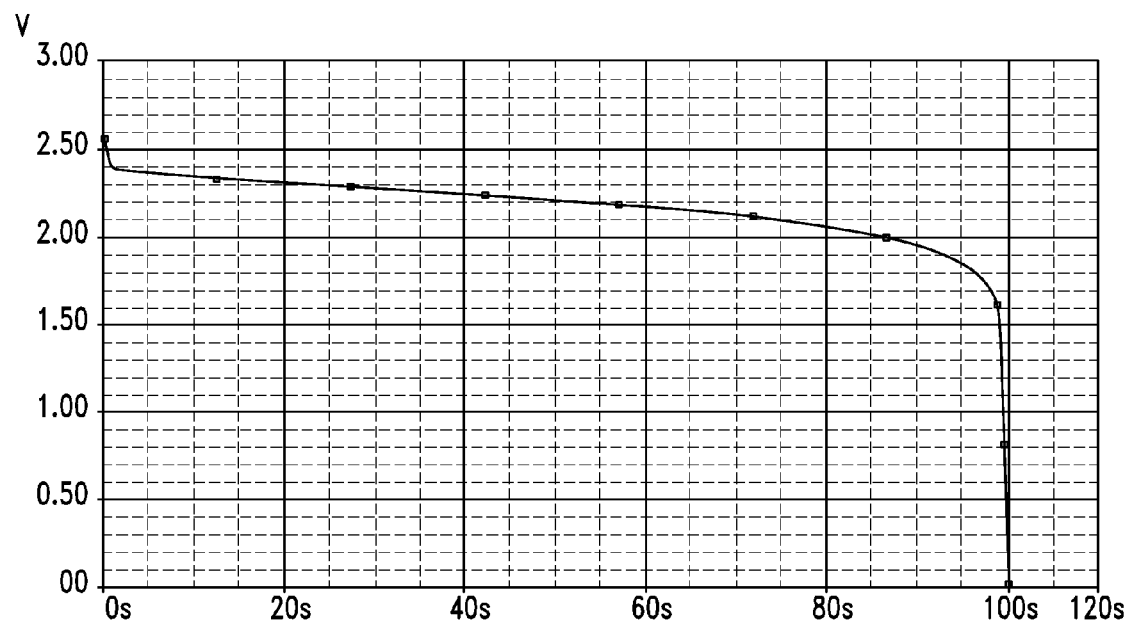
FIGS. 11A-11B and 12A-12B show the results of simulations carried out on the managing circuit according to one embodiment of the invention.
Figure 11B:
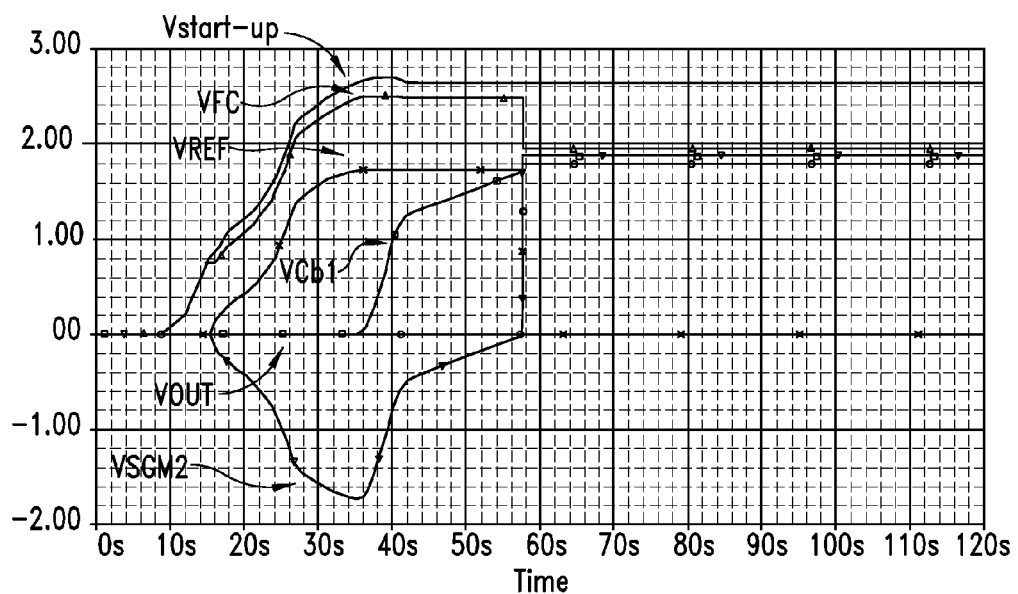
Figure 12A:
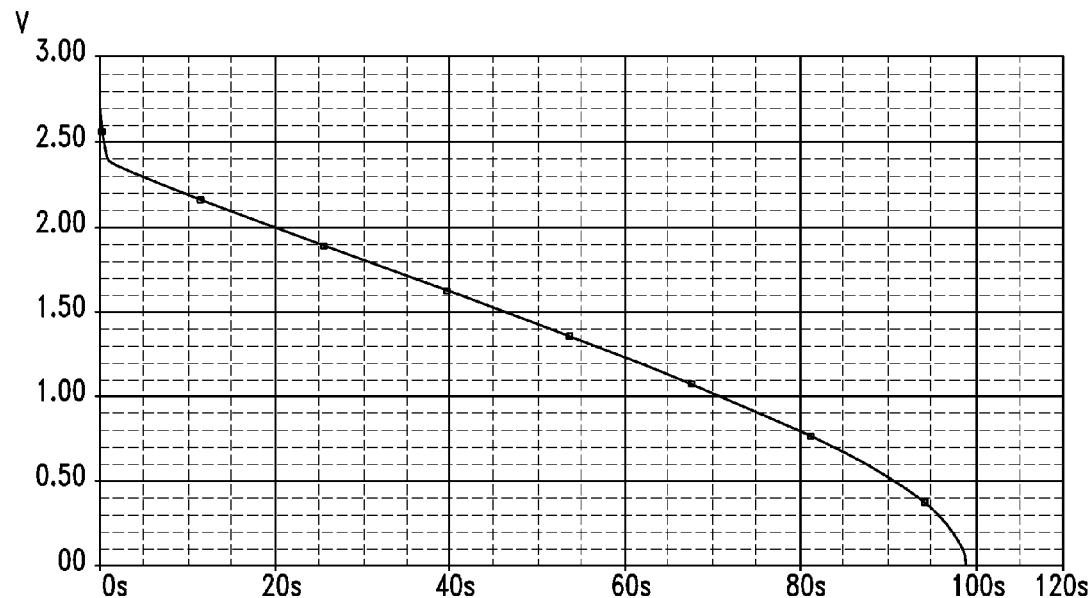
Figure 12B:
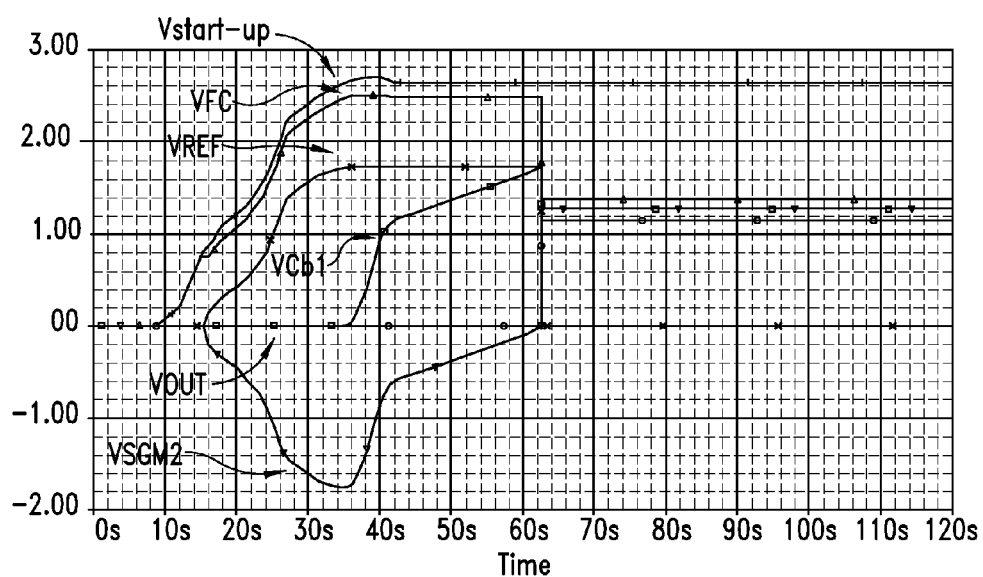

In particular, the simulations have been repeated when the static I-V characteristic of the stack 11 of micro fuel cells varied. The results of these simulations—carried out with the voltage profiles indicated in FIGS. 11A and 12A—are shown in FIGS. 11B and 12B where a typical start-up profile Vstart-up, the stack voltage $V_{FC}$, the reference voltage signal VREF, the voltage Vcb1 across the pre-ignition capacitor Cb1, the voltage $V_{SGM2}$ between source and gate of the second enable transistor M2 and the output voltage $V_{OUT}$ are represented.

Figure 13A:
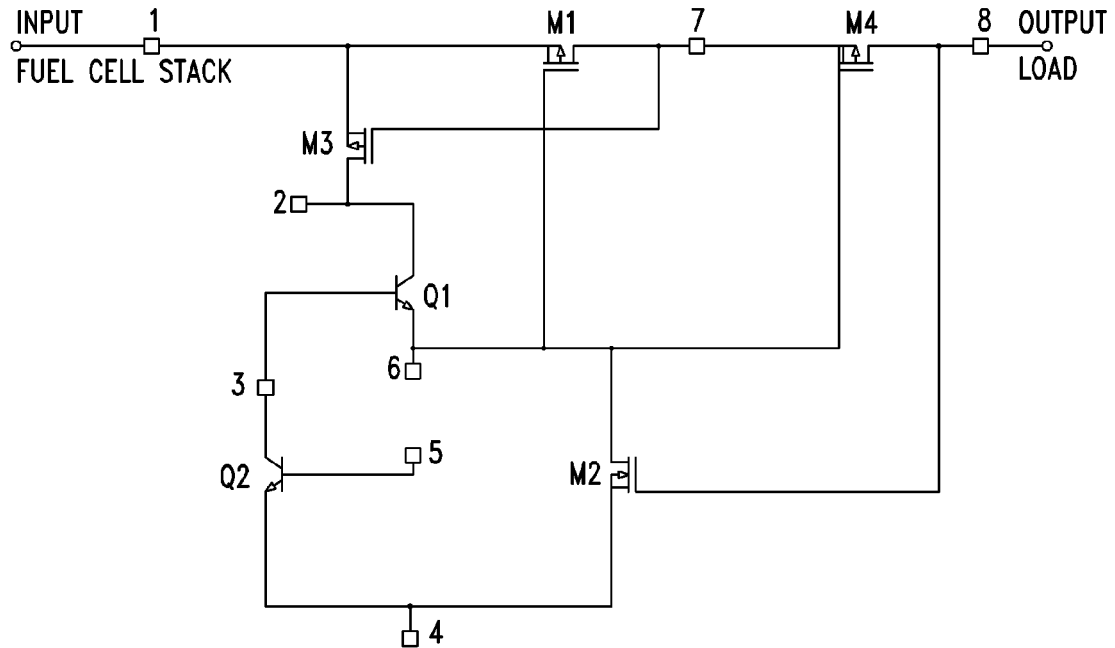
FIGS. 13A-13B show a possible integration of the managing circuit according to one embodiment of the invention.
Figure 13B:
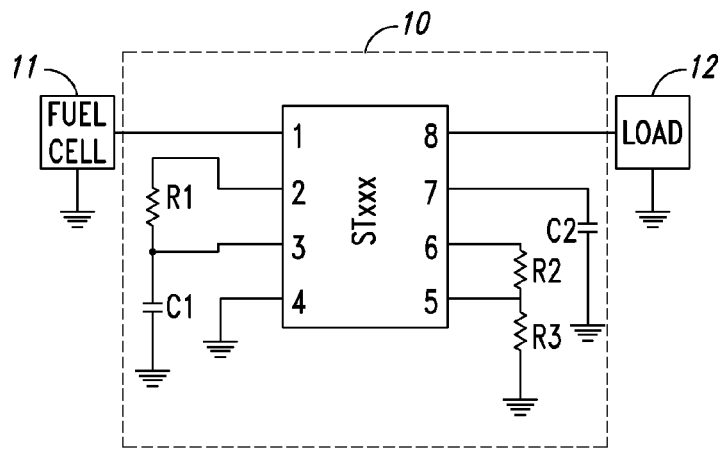

Advantageously, the managing circuit 10 can be easily integrated. In particular, it is possible to integrate the transistors comprised therein, by connecting, as external components, the resistors R1, R2 and R3 and the capacitors Cb1 and Cb2, by means of suitable PINs, as shown in FIGS. 13A and 13B, where the portion to be integrated (FIG. 13A) and the discrete equivalent of the managing circuit 10 as proposed (FIG. 13B) are shown.

In conclusion, the method and the circuit for managing the start-up phase of a stack of micro fuel cells allow to ensure that the stack of micro fuel cells is connected to the load only at the end of its start-up period, i.e., when it is possible to exploit its potentialities at the maximum, its static I-V characteristic having stabilized.

Advantageously, the method and the circuit for managing the start-up phase provide an operation mode of the stack of micro fuel cells in the pre-ignition state, useful for monitoring the start-up profile at best, regulating possible spurious peaks on the start-up current of the stack itself.

Moreover, by acting on the value of the pre-ignition capacitor Cb1 it is also possible to intervene on the duration of the staying time of the managing circuit 10 in this pre-ignition state.

The value of the third resistor R3 is linked to the current absorbed by the generator block 20. Moreover, the values of this third resistor R3 and of the filtering capacitor Cb2 is linked to the cut-off frequency of the low-pass filter 19 realized thereby inside the generator block 20.

Furthermore, the managing circuit 10 as proposed allows to fix the ignition threshold value $V_{TH}$ in an accurate way by dimensioning the resistances R1 and R2 fixing a limit value VLIM* of the driving voltage signal VREF according to the relation:

$$V_{LIM}^{*} \approx 0.85 \cdot V_{BE2}\left(1 + \frac{R1}{R2}\right)$$

$V_{BE2}$ being the difference of voltage between base and emitter of the second bipolar transistor Q2.

Advantageously, the managing circuit 10 shows a low power consumption and operates using only a small portion of the energy generated by the stack of micro fuel cells, thus not requiring an external supply battery.

Suitably, a shut down threshold $V_{TL}$ is also provided for the disconnection of the load when the stack of micro fuel cells has ended the fuel.

Finally, it is to be noted that the managing circuit 10 although absorbing a small current from the stack of micro fuel cells can be used as evidence of the operation of the stack itself.

The managing circuit 10 can thus be used also in applications wherein possible buffer batteries already present can be completely down thus overcoming the limitations of the known supply systems and allowing to manage the start-up phase of the stack of micro fuel cells independently from the presence of a charge buffer battery.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A managing circuit, comprising:
   an input terminal configured to be coupled to at least one micro fuel cell;
   an output terminal configured to be coupled to a load;
   a first enable block coupled between said input and output terminals and having an input coupled to the input terminal, an output coupled to the output terminal, and a control terminal;
   a generator block structured to generate a reference voltage signal and having an output coupled to the control terminal of the first enable block; and
   a first control block coupled between said input terminal and an input of said generator block, the first control block having a control terminal coupled to the output of said first enable block.

2. A managing circuit according to claim 1, further comprising a second enable block coupled, in series to said first enable block, between said input and output terminals and having a control terminal coupled to said output of said generator block.

3. A managing circuit according to claim 2 wherein said first and second enable blocks comprise respective first and second enable transistors having respective conduction terminals coupled, in series to each other, between said input and output terminals and respective control terminals coupled to said output of said generator block.

4. A managing circuit according to claim 3 wherein said first and second enable transistors are MOS transistors.

5. A managing circuit according to claim 1 wherein said generator block is coupled between the first control block and a voltage reference terminal and comprises:
   a first transistor coupled between said first control block and said output of said generator block; and
   a first resistor and a second resistor coupled, in series to each other, between said first control block and said voltage reference terminal.

6. A managing circuit according to claim 5 wherein said generator block further comprises a third resistor and a second transistor coupled, in series to each other, between said first control block and said voltage reference terminal and defining together a first interconnection node coupled to a control terminal of said first transistor.

7. A managing circuit according to claim 6 wherein said second transistor has a control terminal coupled to a second interconnection node defined by said first and second resistors.

8. A managing circuit according to claim 6 wherein said generator block further comprises a filtering capacitor coupled, in parallel to said second transistor between said first interconnection node and said voltage reference terminal, said third resistor and said filtering capacitor realizing a low-pass filter of said generator block.

9. A managing circuit according to claim 6 wherein said first and second transistors of said generator block are bipolar transistors.

10. A managing circuit according to claim 5, further comprising a second enable block coupled to the first enable block at an inner circuit node, the control terminal of the first control block being coupled to the inner circuit node.

11. A managing circuit according to claim 10 wherein said first control block comprises a first control transistor having conduction terminals coupled to said input terminal and to said first inner circuit node and a control terminal coupled to said second inner circuit node.

12. A managing circuit according to claim 11, further comprising a second control transistor having conduction terminals, respectively coupled to said output of said generator block and to said voltage reference terminal, and a control terminal coupled to said output terminal of said managing circuit, wherein said first and second control transistors are MOS transistors.

13. A managing circuit according to claim 5, further comprising a second control block coupled between said output of said generator block and said voltage reference terminal and having a control terminal coupled to said output terminal of said managing circuit.

14. A managing circuit according to claim 13 wherein said second control block comprises a second control transistor having conduction terminals coupled to said output of said generator block and to said voltage reference and a control terminal coupled to said output terminal of said managing circuit.

15. A managing circuit according to claim 1, further comprising:
a second enable block coupled, in series to said first enable block, between said input and output terminals and having a control terminal coupled to said output of said generator block; and
a pre-ignition capacitor coupled between a voltage reference terminal and an inner circuit node defined by an interconnection of said first and second enable blocks.

16. A supply system, comprising:
at least one micro fuel cell; and
a managing circuit that includes:
an input terminal coupled to said at least one micro fuel cell;
an output terminal configured to be coupled to a load;
a first enable block coupled between said input and output terminals and having an input coupled to the input terminal, an output coupled to the output terminal, and a control terminal;
a generator block structured to generate a reference voltage signal and having an output coupled to the control terminal of the first enable block; and a control block coupled between said input terminal and an input of said generator block, the control block having a control terminal coupled to the output of said first enable block.

17. A supply system according to claim 16, further comprising a second enable block coupled, in series to said first enable block, between said input and output terminals and having a control terminal coupled to said output of said generator block.

18. A supply system according to claim 16 wherein said generator block is coupled between the control block and a voltage reference terminal and comprises:
a first transistor coupled between said control block and said output of said generator block; and
a first resistor and a second resistor coupled, in series to each other, between said control block and said voltage reference terminal.

19. A supply system according to claim 18 wherein said generator block further comprises a third resistor and a second transistor coupled, in series to each other, between said control block and said voltage reference terminal and defining together a first interconnection node coupled to a control terminal of said first transistor.

20. A supply system according to claim 19 wherein said second transistor has a control terminal coupled to a second interconnection node defined by said first and second resistors.

21. A supply system according to claim 19 wherein said generator block further comprises a filtering capacitor coupled, in parallel to said second transistor between said first interconnection node and said voltage reference terminal, said third resistor and said filtering capacitor realizing a low-pass filter of said generator block.

22. A supply system according to claim 16, wherein the managing circuit includes a second enable block coupled to the first enable block at an inner circuit node, the control terminal of the control block being coupled to the inner circuit node.

23. A supply system according to claim 16, wherein the managing circuit includes a control block coupled between said output of said generator block and a voltage reference terminal and having a control terminal coupled to said output terminal of said managing circuit.

24. A supply system according to claim 23 wherein said control block comprises a control transistor having conduction terminals coupled to said output of said generator block and to said voltage reference terminal and a control terminal coupled to said output terminal of said managing circuit.

25. A managing circuit, comprising:
an input terminal configured to be coupled to at least one micro fuel cell;
an output terminal configured to be coupled to a load;
a first enable switch having a switchable conduction path between said input and output terminals and having an input coupled to the input terminal, an output coupled to the output terminal, and a control terminal;
a generator block structured to generate a reference voltage signal and having an output coupled to the control terminal of the first enable switch; and
a first control switch having a switchable conduction path between said input terminal and an input of said generator block, the first control switch having a control terminal coupled to the output of said first enable block.

26. A managing circuit according to claim 25, further comprising a second enable switch coupled, in series to said first enable block, between said input and output terminals and having a control terminal coupled to said output of said generator block.

27. A managing circuit according to claim 26, further comprising a second control switch having conduction terminals, respectively coupled to said output of said generator block and to a voltage reference terminal, and a control terminal coupled to said output terminal of said managing circuit.

28. A managing circuit according to claim 25 wherein said generator block is coupled between the first control switch and a voltage reference terminal and comprises:

a first transistor coupled between said first control switch and said output of said generator block; and a first resistor and a second resistor coupled, in series to each other, between said output of said generator block and said voltage reference terminal.

29. A managing circuit according to claim 28 wherein said generator block further comprises a third resistor and a second transistor coupled, in series to each other, between said first control switch and said voltage reference terminal and defining together a first interconnection node coupled to a control terminal of said first transistor.

30. A managing circuit according to claim 29 wherein said second transistor has a control terminal coupled to a second interconnection node defined by said first and second resistors.

* * * * *